US012138641B2

(12) United States Patent
Nakashima et al.

(10) Patent No.: US 12,138,641 B2
(45) Date of Patent: Nov. 12, 2024

(54) WATER SPOUTING APPARATUS

(71) Applicant: TOTO LTD., Kitakyushu (JP)

(72) Inventors: Takahiro Nakashima, Kitakyushu (JP); Ryohei Yaita, Kitakyushu (JP); Yuki Moriizumi, Kitakyushu (JP); Takeshi Murashita, Kitakyushu (JP); Kanako Hanashiro, Kitakyushu (JP)

(73) Assignee: Toto Ltd., Fukuoka (JP)

( * ) Notice: Subject to any disclaimer, the term of this patent is extended or adjusted under 35 U.S.C. 154(b) by 302 days.

(21) Appl. No.: 17/585,116

(22) Filed: Jan. 26, 2022

(65) Prior Publication Data

US 2022/0266269 A1 Aug. 25, 2022

(30) Foreign Application Priority Data

Feb. 24, 2021 (JP) ................................ 2021-027615

(51) Int. Cl.
*B05B 1/34* (2006.01)
*B05B 1/08* (2006.01)
*B05B 1/18* (2006.01)

(52) U.S. Cl.
CPC .................. *B05B 1/18* (2013.01); *B05B 1/08* (2013.01); *B05B 1/3415* (2013.01)

(58) Field of Classification Search
CPC ........... B05B 1/08; B05B 1/18; B05B 1/3415; B05B 1/185; B05B 1/34; B05B 1/048; B05B 1/10; B05B 1/202; B05B 1/267; B05B 1/3405; F15C 1/22
USPC ....................................................... 239/589.1
See application file for complete search history.

(56) References Cited

U.S. PATENT DOCUMENTS

| | | | | | |
|---|---|---|---|---|---|
| 4,151,955 | A * | 5/1979 | Stouffer | B05B 1/08 | 239/589.1 |
| 7,461,796 | B2 * | 12/2008 | Yamaguchi | B05B 1/04 | 239/589.1 |
| 2011/0233301 | A1 * | 9/2011 | Gopalan | B05B 1/08 | 239/548 |
| 2017/0165687 | A1 | 6/2017 | Ukigai et al. | | |

FOREIGN PATENT DOCUMENTS

| | | |
|---|---|---|
| JP | 2017-108830 A | 6/2017 |

* cited by examiner

*Primary Examiner* — Joseph A Greenlund
*Assistant Examiner* — Juan C Barrera
(74) *Attorney, Agent, or Firm* — BakerHostetler

(57) ABSTRACT

The present invention is a water spouting apparatus (1) that discharges water with reciprocal motion, and has a water spouting apparatus body (10) and a oscillation generating element (22). The oscillation generating element includes a water supply conduit (24), a collision part (30) that generates a vortex on the downstream side, a vortex street conduit (26) provided downstream of the water supply conduit, and a discharge conduit that discharges water guided by the vortex street conduit. The vortex street conduit is configured by connecting the upstream member (18) on which the upstream side is formed and the downstream member (20) on which the downstream side is formed. At the connection between the upstream and downstream members, the height of the vortex street at the upstream end of the downstream member (H2) is higher than the height (H1) of the vortex street at the downstream end of the upstream member.

9 Claims, 13 Drawing Sheets

WATER SPOUTING APPARATUS

CROSS-REFERENCE TO RELATED APPLICATION

This application claims benefit of priority to Japanese Patent Application No. 2021-027615, filed on Feb. 24, 2021, the entire content of which is incorporated herein by reference.

TECHNICAL FIELD

The present invention pertains to a water spouting apparatus, and more particularly to a water spouting apparatus for spouting water as it causes the water to oscillate.

BACKGROUND ART

Unexamined Patent Application 2017-108830 (Patent Document 1) describes a water spouting apparatus. This water spouting apparatus comprises an oscillation generating element for spouting supplied water as it causes said water to oscillate. The oscillation generating element has: a water supply conduit; a collision portion provided at the downstream end of the water supply conduit; a vortex generating conduit for guiding vortices generated by the collision of water with the collision portion, and a spout port conduit provided on the downstream side of the vortex generating conduit. Water supplied to the water spouting apparatus flows into the water supply conduit of the oscillation generating element and collides with the collision portion disposed at the downstream end thereof. As the result of water colliding with the collision portion, vortices in alternating opposite directions are generated within the vortex generating conduit on the downstream side and are guided toward the downstream side by the vortex generating conduit. The flow of water containing vortices guided by the vortex generating conduit is discharged as it is oscillated from a spout port conduit having a narrower flow path cross-sectional area than the vortex generating conduit.

PRIOR ART DOCUMENTS

Patent Documents

[Patent Document 1] Japanese Unexamined Patent Publication No. 2017-108830

SUMMARY OF THE INVENTION

Problems to be Solved by the Invention

In the oscillation generating element described in Patent Document 1, a collision portion is disposed between the water supply conduit and the vortex generating conduit, and a spout port conduit with a narrow flow path cross-sectional area is disposed on the downstream side of the vortex generating conduit. Because the oscillation generating element has this structure, it is difficult to mold as a single piece from resin. I.e., when an oscillation generating element is composed as a single piece from resin, it is difficult to remove the molding die from the space between the collision portion and the spout port conduit. For this reason, when an oscillation generating element was molded as a single piece from a resin, an elastically deformable resin was conventionally selected as the molding resin, and the mold was extracted by elastically deforming the molded part. Therefore, when molding an oscillation generating element as a single piece with resin, the problem arises that usable resins are limited.

On the other hand, a constitution is conceivable in which the oscillation generating element to be molded is divided at the vortex generating conduit part, such that the oscillation generating element comprises two members. By dividing the oscillation generating element into two members in this way, each member can be formed into a shape which allows easy extraction from the mold and facilitates molding. In this case, however, there is a risk that the shape accuracy of the vortex generating conduit will decrease at the connecting portion between the two members. I.e., in a compact oscillation generating element, extremely high dimensional accuracy and shape accuracy are required of the two members constituting the oscillation generating element. For example, if an oscillation generating element is formed by joining two members, and a step difference is formed along the vortex generating conduit of the formed oscillation generating element, there is a risk that performance as an oscillation generating element will deteriorate, or that functionality as an oscillation generating element will be lost.

Therefore, an object of the present invention is to provide a water spouting apparatus comprising an oscillation generating element which can be easily molded, without inviting a significant deterioration in performance.

Means for Solving the Problem

To solve the aforementioned problems, the present invention is a water spouting apparatus for discharging water with reciprocal motion, comprising: a water spouting apparatus body and a oscillation generating element disposed on this water spouting apparatus body for spouting water while oscillating the water within a predetermined oscillation plane; whereby the oscillation generating element comprises: a water supply conduit into which supplied water flows, a collision portion disposed on the downstream end portion of the water supply conduit so as to block a portion of the flow path cross section of this water supply conduit, such that collision of the water guided by the water supply conduit causes vortices in alternating opposing directions to be generated at the downstream side thereof, a vortex street conduit disposed downstream of the water supply conduit so as to guide vortices formed by this collision portion, with a width in the direction parallel to the oscillation plane which is wider than its height in the direction perpendicular to the oscillation plane, and a water spouting conduit for spouting water guided by the vortex street conduit; whereby the vortex street conduit is constituted by connecting an upstream member on which the upstream side of the vortex street conduit is formed and a downstream member on which the downstream side of the vortex street conduit is formed; and in a connecting portion between the upstream member and the downstream member, the height of the vortex street conduit on the upstream end of the downstream member is higher than the height of the vortex street conduit at the downstream end of the upstream member, so that no step difference is formed to narrow the flow path in the height direction toward the downstream side on an inner wall surface of the vortex street conduit.

In the present invention thus constituted, water flowing into the water supply conduit of the oscillation generating element disposed on the water spouting apparatus body collides with the collision portion, generating vortices in alternating opposite directions on the downstream side. The flow of water including the generated vortices is guided by the downstream side vortex street conduit and is discharged from the discharge conduit while oscillating within a predetermined oscillation plane. The vortex street conduit is constituted to connect an upstream member on which the upstream side is formed to a downstream member on which the downstream side is formed, and the height of the vortex street conduit at the upstream end of the downstream member is formed to be higher than the height of the vortex street conduit at the downstream end of the upstream member.

In the invention thus constituted, the vortex street conduit is formed to connect the upstream member and the downstream member, therefore the upstream member and downstream member can be constituted by shapes which are easily extracted from a mold when molding resin. The selectable range of usable molding resins can thus be expanded.

On the other hand, because in the present invention the vortex street conduit is constituted by an upstream member and a downstream member, there is a possibility that a step difference will form on the inner wall surface of a vortex street conduit to which these members are connected. Here the present inventor has discovered that even when an oscillation generating element is constituted by two members and a step difference is formed on the inner wall surface of a vortex street conduit, no major degradation in oscillation generating element performance occurs if there is no step difference formed on the inner wall surface of the vortex street conduit, narrowing the flow path in the height direction towards the downstream side. In the invention thus constituted, the height of the vortex street conduit on the upstream end of the downstream member is higher than the height of the vortex street conduit at the downstream end of the upstream member. Therefore, even if there are dimensional variances or shape variances in the upstream member or the downstream member, the formation of step differences which narrow the flow path in the height direction at the connecting portion of these members can be easily prevented, and significant deterioration of oscillation generating element performance can be avoided while molding of the upstream member and the downstream member is facilitated.

In the present invention the vortex street conduit formed in the downstream member is preferably constituted so that its height smoothly decreases in the downstream direction. First, in the present invention, the height of the vortex street conduit at the upstream end of the downstream member is arranged to be higher than the height of the vortex street conduit at the downstream end of the upstream member, therefore the flow path cross-sectional area of the vortex street conduit widens at the connecting portion of the upstream member and the downstream member. The flow velocity of water flowing from the upstream member into the downstream member thus decreases. In the invention thus constituted, however, the vortex street conduit formed in the downstream member is constituted so that its height gradually decreases in the downstream direction, therefore the flow velocity of the water flowing into the downstream member gradually rises toward the downstream direction. As a result, the flow velocity of water flowing in the vortex street conduit can be made to approach the flow velocity when water flows out from the upstream member, and the negative effect of dividing the vortex street conduit into two members can be ameliorated. Further, because the vortex street conduit in the downstream member is constituted so that its height gradually diminishes, with no step difference, it is not prone to affect the vortex contained in water flowing in the conduit, and water can be discharged with the desired oscillating vibration angle and water sensation.

In the present invention the vortex street conduit formed in the downstream member preferably has a tapered portion constituted so that its height diminishes in the downstream direction. In the invention thus constituted, placement of a tapered portion in the vortex street conduit results in a reduction in the height of the vortex street conduit in the downstream direction, so that the vortex street conduit height can be gradually reduced using a simple shape.

In the present invention the height of the downstream end of the vortex street conduit formed in the downstream member is preferably the same as the height of the downstream end of the vortex street conduit formed in the upstream member. In the invention thus constituted, because the height at the downstream end of the downstream member vortex street conduit is the same as the height at the downstream end of the upstream member vortex street conduit, the flow velocity of water which had been reduced at the connecting portion of the upstream member and the downstream member can be returned to the flow velocity at the downstream end of the upstream member vortex street conduit. As a result, the effect of the vortex street conduit being composed of two members can be further reduced.

In the present invention, preferably, the length from the upstream end of the collision portion to the downstream end of the vortex street conduit formed in the upstream member is 2.5 or greater times the maximum width of the collision portion.

In the present invention, the vortex generated by the collision of water with the collision portion grows as it is guided by the vortex street conduit. In the invention thus constituted, the length from the upstream end of the collision portion to the downstream end of the vortex street conduit formed in the upstream member is 2.5 or greater times the maximum width of the collision portion. The generated vortex will thus pass through the connecting portion between the upstream member and the downstream member after growing sufficiently in the vortex street conduit, and the negative effect of the flow including vortices passing through the connecting portion can be ameliorated.

In the present invention the oscillation generating element is preferably constituted so that at the connecting portion between the upstream member and the downstream member, the width of the vortex street conduit at the upstream end of the downstream member is wider than the width of the vortex street conduit at the downstream end of the upstream member.

In the invention thus constituted, at the connecting portion between the upstream member and the downstream member, the width of the vortex street conduit at the upstream end of the downstream member is constituted to be wider than the width of the vortex street conduit at the downstream end of the upstream member. As a result, formation of a step difference which narrows the vortex street conduit in the width direction toward the downstream side can be prevented, further alleviating the negative effect of forming the vortex street conduit by dividing it into an upstream member and a downstream member.

In the present invention the oscillation generating element preferably comprises a bypass conduit downstream of the collision portion which causes water to flow into the vortex street conduit, wherein a portion of the inner wall surface of this bypass conduit is formed by the downstream member.

In the invention thus constituted, the oscillation generating element comprises a bypass conduit, therefore the oscillating oscillation amplitude and the like of water discharged from the oscillation generating element can also be adjusted by the flow volume of water flowing in from the bypass conduit. Further, a part of the bypass conduit inner wall surface is formed by the downstream member, therefore an oscillation generating element comprising a bypass conduit can be easily formed.

In the present invention, preferably, only the inner wall surface positioned on the furthest downstream side of the bypass conduit is formed by the downstream member. In the invention thus constituted, only the inner wall surface positioned on the furthest downstream side of the bypass conduit is formed by the downstream member, therefore the part where the vortex street conduit flow path cross sectional surface area changes due to connection of the bypass conduit and the part where the flow path cross sectional surface area changes due to connection of the upstream member and the downstream member can be consolidated into one, and the negative effects produced by changes in flow path cross sectional surface area can be ameliorated. Further, by forming only the inner wall surface positioned on the furthest downstream side of the bypass conduit with a downstream member, the part where the flow path cross-sectional area changes due to connection of the upstream member to the downstream member is separated from the collision portion, and vortices formed by the collision portion can be made to grow sufficiently.

In the present invention, preferably, the upstream member is formed of a hard member and the downstream member is formed of a soft member. In the invention thus constituted, deformation of a vortex street conduit due to water pressure can be suppressed in the part on the upstream side where water pressure is relatively high by forming the upstream member from a hard member. By forming the downstream member from a soft member, the discharge conduit part can be elastically deformed and even if the calcium component contained in tap water is deposited and solidified inside the downstream end discharge conduit, that calcium component (scale) can be easily removed.

Effect of the Invention

The present invention provides a water spouting apparatus comprising an easily molded oscillation generating element without inviting a significant reduction in performance.

BEST MODE FOR CARRYING OUT THE INVENTION

Figure 1:
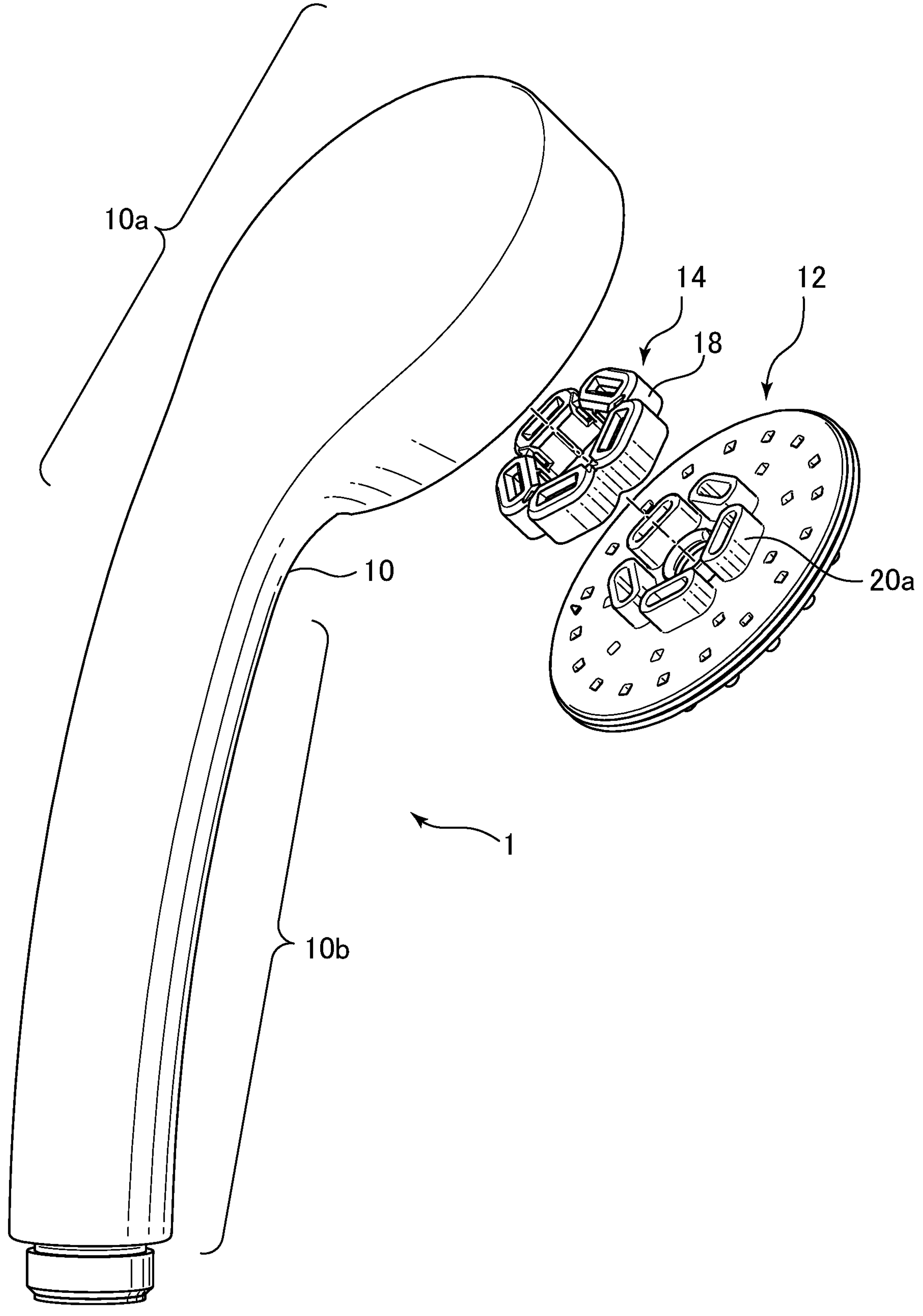
FIG. 1: An exploded perspective view seen from above of a water spouting apparatus according to a first embodiment of the invention.
Figure 2:
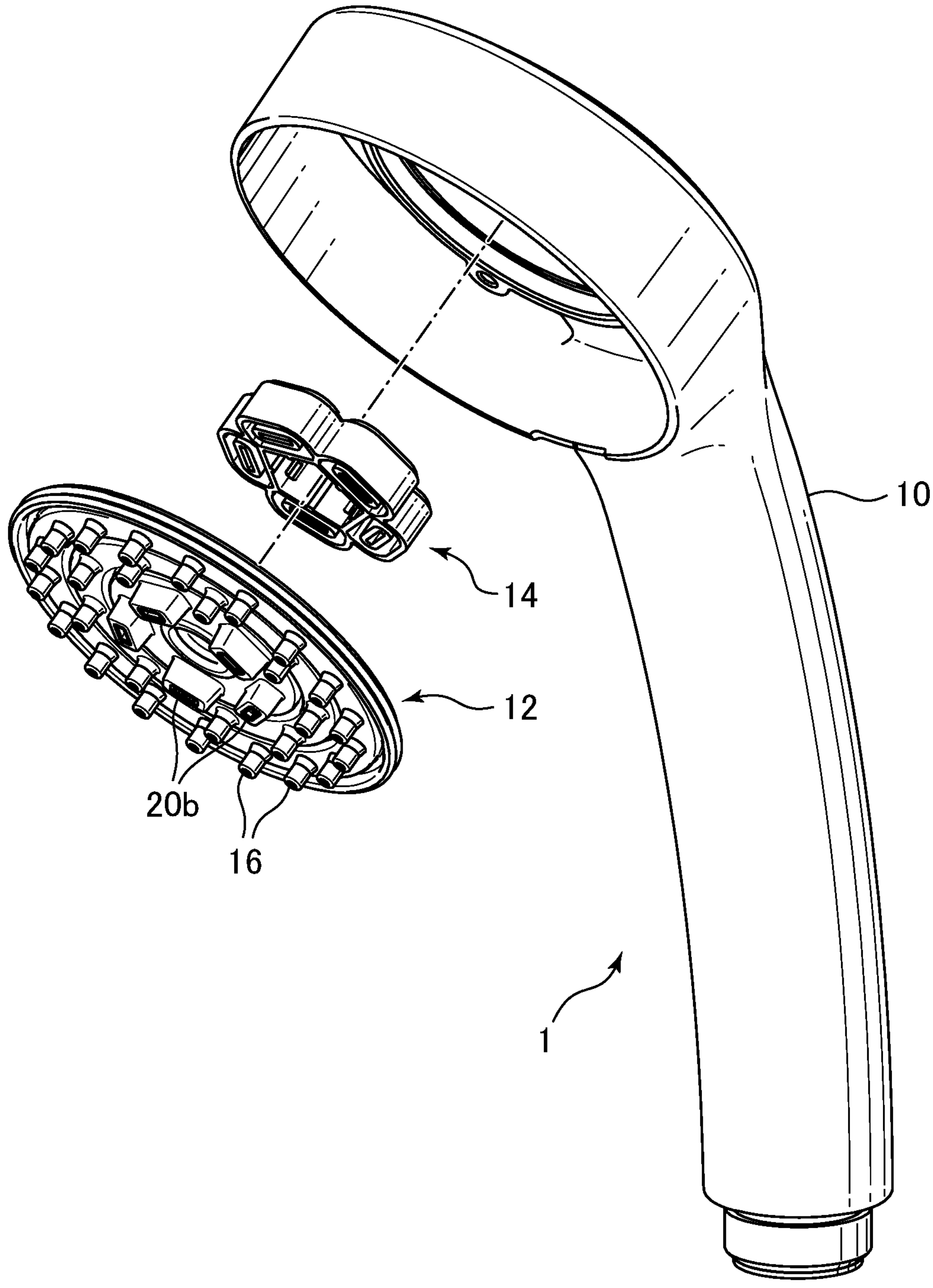
FIG. 2: An exploded perspective view seen from below of a water spouting apparatus according to a first embodiment of the invention.

Next, referring to the attached drawings, we explain a water spouting apparatus according to an embodiment of the invention. FIG. 1 is an exploded perspective view seen from above of a water spouting apparatus according to a first embodiment of the invention. FIG. 2 is an exploded perspective view seen from below of a water spouting apparatus according to a first embodiment of the invention.

As shown in FIGS. 1 and 2, the water spouting apparatus 1 of the present embodiment is what is referred to as a hand shower, constituted by a water spouting apparatus body 10, a water dispersion plate 12 attached to water spouting apparatus body 10, and a functional member 14 attached to the back surface of water dispersion plate 12.

Water spouting apparatus body 10 has a water discharge head portion 10*a* and a grip portion 10*b* and is constituted so that supplied water flows into the interior thereof. Dispersion plate 12 is a substantially disk-shaped member and is attached to the water discharge head portion 10*a* of water spouting apparatus body 10. Also, as shown in FIG. 2, multiple cylindrical spray nozzles 16 are disposed to project from the front surface of spray plate 12.

Also, as shown in FIG. 1, functional member 14 is attached to the center of the back surface side of dispersion plate 12, and together with part of the dispersion plate 12 constitutes five oscillation generating elements. This oscillation generating element is constituted to discharge supplied water while causing it to oscillate within a predetermined oscillation plane. Details of the oscillation generating element are described below.

Water spouting apparatus 1 of the present embodiment is constituted so that supplied water flows into water spouting apparatus body 10 and passes through spray nozzles 16 on spray plate 12 attached to water discharge head 10*a* and the oscillation generating element to be shower-discharged. Water discharged from each spray nozzle 16 is respectively discharged in a linear shape, and the water discharged from each oscillation generating element is discharged while oscillating within a predetermined oscillation plane.

Figure 3:
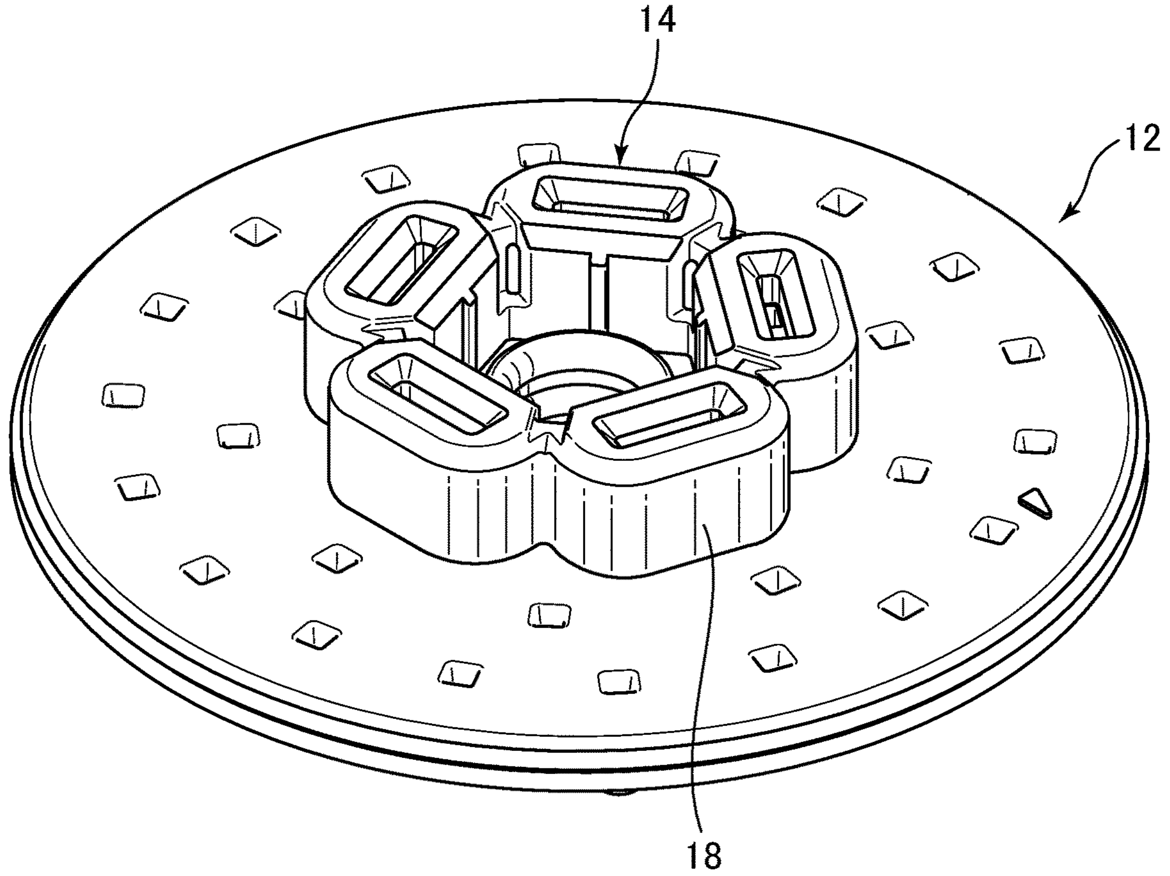
FIG. 3: A perspective view showing a state in which a functional member is attached to a water dispersion plate in a water spouting apparatus according to a first embodiment of the invention.
Figure 4:
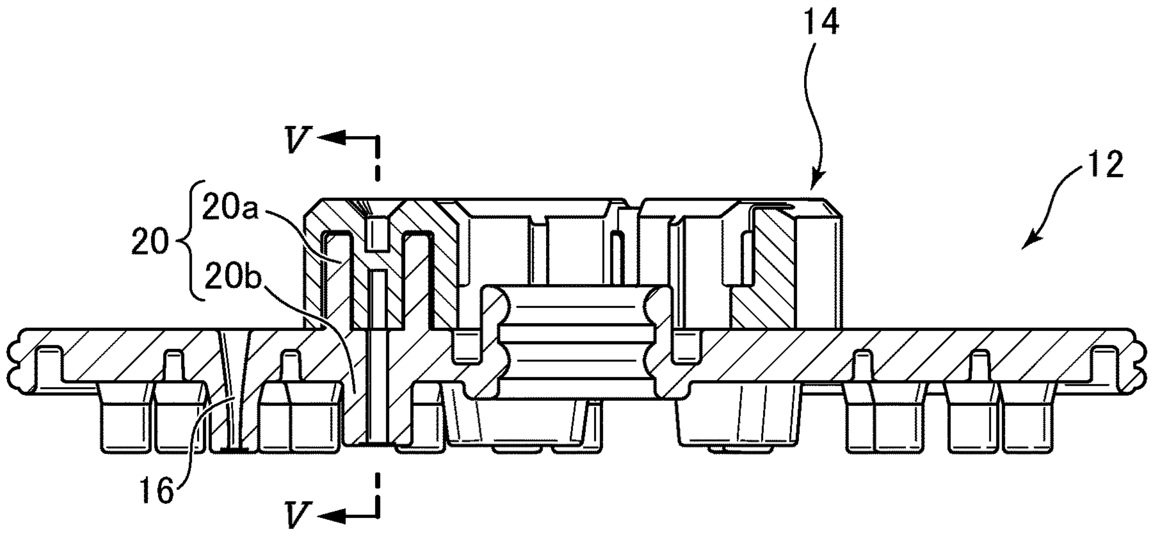
FIG. 4: A cross-sectional view of a water spouting apparatus according to a first embodiment of the invention wherein a functional member is attached to a water dispersion plate.
Figure 5:
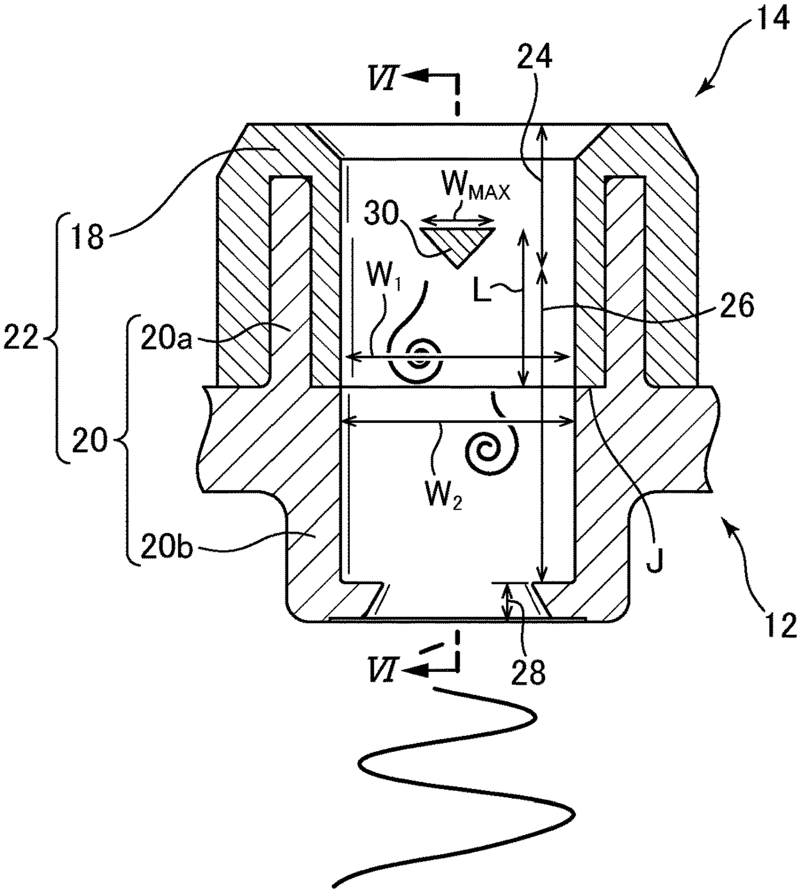
FIG. 5: A cross-sectional view along line V-V of FIG. 4.
Figure 6:
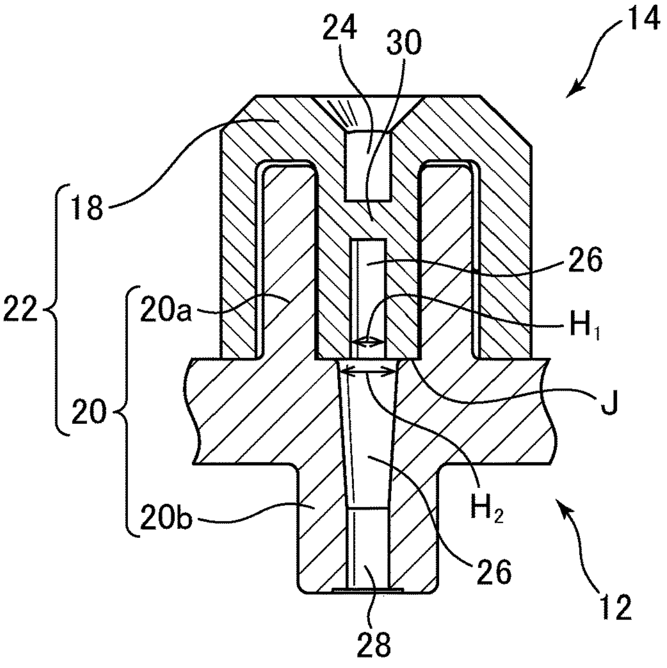
FIG. 6: A cross-sectional view along line VI-VI of FIG. 5.

Next, again referring to FIGS. 3 through 6, we explain the oscillation generating element. FIG. 3 is a perspective view showing the state in which functional member 14 is attached to dispersion plate 12; FIG. 4 is a cross-sectional view thereof. Also, FIG. 5 is a cross-sectional view along line V-V of FIG. 4, focusing on only a single oscillation generating element part. FIG. 6 is a cross-sectional view along line VI-VI in FIG. 5.

Oscillation generating element 22 is constituted by connecting upstream member 18 and downstream member 20 (FIG. 5). I.e., in the present embodiment, as shown in FIG. 3, five upstream members 18 are joined in an annular shape to constitute the above-described functional member 14. Also, in the present embodiment, as shown in FIG. 4, downstream member 20 is integrally formed with dispersion plate 12, and a portion of dispersion plate 12 functions as downstream member 20.

I.e., as shown in FIG. 4, downstream member 20 is constituted by a back surface portion 20*a* (FIG. 1) formed to project on the rear surface side of dispersion plate 12, and a front surface portion 20*b* (FIG. 2) formed to project on the front surface side of dispersion plate 12. Thus, in the present embodiment, five oscillation generating elements 22 arranged in an annular shape are constituted by attaching functional member 14 to the back surface side of dispersion plate 12. Also, in the present embodiment functional member 14 (upstream member 18) is formed of a hard member (e.g., POM (polyacetal)), and dispersion plate 12 (downstream member 20) is formed of a soft member (e.g., TPE (thermoplastic elastomer)). Note also that in the present embodiment functional member 14 is fitted into dispersion plate 12 to join the two together, but upstream member 18 and downstream member 20 may be joined by any desired method such as adhesion or welding. Also, any member of approximately the strength required so that it does not deform under normal water supply pressure is acceptable for the hard member; e.g., an ABS resin (acrylonitrile, butadiene, styrene copolymer) or the like is acceptable. Further, the soft member may be any member capable of easily elastically deforming under user-applied force, and may be, for example, silicone rubber.

As shown in FIG. 5, oscillation generating element 22 has: a water supply conduit 24 into which supplied water flows, a vortex street conduit 26 disposed downstream of this water supply conduit 24, and a discharge conduit 28 for discharging water guided by the vortex street conduit. Further, a collision portion 30 is disposed at the downstream end of water supply conduit 24 to block a part of the flow path cross section of water supply conduit 24. Each oscillation generating element 22 is constituted so that supplied water is spouted from the downstream end of discharge conduit 28 as it is oscillated within an oscillation plane parallel to the paper surface in FIG. 5.

Water supply conduit 24 is constituted so that water flowing into water spouting apparatus body 10 flows into it, and so that it is a conduit of fixed cross-sectional dimensions and shape. Also, water supply conduit 24 is formed to have a flat rectangular cross section, whereby its width in the direction parallel to the oscillation plane is larger than its height in the direction perpendicular to the oscillation plane. Also, a vortex street conduit 26 with the same cross-sectional shape is continuously disposed downstream in water supply conduit 24.

Collision portion 30 is disposed at the downstream end portion of water supply conduit 24 to block a part of the water supply conduit 24 flow path cross section. I.e., collision portion 30 is disposed to connect the two inner wall surfaces parallel to the oscillation plane to one another, thereby forming water supply conduit 24 and vortex street conduit 26 (FIG. 6). Also, in the present embodiment collision portion 30 is formed in an isosceles right triangle shape as viewed from a direction perpendicular to the oscillation plane and is disposed at the center of water supply conduit 24 so that its hypotenuse faces upstream. Collision of water guided by water supply conduit 24 with collision portion 30 generates vortices in alternating opposite directions on the downstream side thereof.

Vortex street conduit 26 is formed downstream of water supply conduit 24 and is constituted to guide vortices formed by collision portion 30. Also, vortex street conduit 26 is a conduit formed to continue with the same cross-sectional dimension and shape as water supply conduit 24 in the upstream portion thereof. I.e., vortex street conduit 26 is a conduit with a flat rectangular cross section formed so that its width in the direction parallel to the oscillation plane is wider than its height in the direction perpendicular to the oscillation plane. As a result of being guided by vortex sequence conduit 26, vortices formed by collision portion 30 move downstream as they grow.

Discharge conduit 28 is a flow path connected to the downstream side of vortex street conduit 26 and is constituted to cause water guided by vortex street conduit 26 to be spouted. Also, the width of the upstream end of discharge conduit 28 is narrower than the width of the downstream end of vortex street conduit 26, and the width broadens in a tapered shape toward the downstream side. On the other hand, as shown in FIG. 6, the height of the discharge conduit 28 in the direction perpendicular to the oscillation plane is the same as the height on the downstream side of vortex street conduit 26 and is a constant height from the upstream end to the downstream end. Alternately opposite vortices generated on the downstream side of collision portion 30 grow in vortex street conduit 26 and are discharged from discharge conduit 28. At this time, the direction of water discharged from discharge conduit 28 oscillates in the oscillation plane as the result of the alternating arrival of opposing direction vortices.

Next, we explain the divided structure of oscillation generating element 22. As described above, each oscillation generating element 22 is composed of two members: an upstream member 18 and a downstream member 20, and water supply conduit 24 and the upstream part of vortex street conduit 26 are formed in upstream member 18. Also, the downstream part of vortex street conduit 26 and discharge conduit 28 are formed in downstream member 20. I.e., the upstream side of vortex street conduit 26 is formed in upstream member 18 and its downstream side is formed in downstream member 20, and it is constituted by connecting upstream member 18 and downstream member 20.

Here, as shown in FIG. 6, the height H2 at the upstream end of vortex street conduit 26 formed in downstream member 20 is higher than the height H1 at the downstream end of vortex street conduit 26 formed in upstream member 18. This prevents the formation of a step difference narrowing the flow path in the height direction toward the downstream side on the inner wall surface of vortex street conduit 26 at the connecting portion J between upstream member 18 and downstream member 20. In addition, the height of the vortex street conduit 26 is tapered from the upstream end to the downstream end in the portion formed on the downstream member 20. I.e., in the present embodiment, the entire vortex street conduit 26 formed in downstream member 20 is configured as a tapered portion. Also, in the present embodiment the height at the downstream end of vortex street conduit 26 formed in downstream member 20 is the same as the height H1 at the downstream end of the vortex street conduit 26 formed in upstream member 18. I.e., the height of vortex street conduit 26 is first expanded at the connecting portion J between upstream member 18 and downstream member 20 and returns to the original height at the downstream end of downstream member 20.

Further, in the present embodiment, as shown in FIG. 5, the width W2 at the upstream end of vortex street conduit 26 formed in downstream member 20 is constituted to be wider than the width W1 at the downstream end of vortex street conduit 26 formed in upstream member 18. As a result, in connecting portion J between upstream member 18 and downstream member 20, formation of a step difference narrowing the flow path toward the downstream side of the inner wall surface of vortex street conduit 26 is also prevented in the width direction.

Furthermore, in the present embodiment the length L from the upstream end of collision portion 30 to the downstream end of vortex street conduit 26 formed in upstream member 18 is approximately 6.7 mm, and the maximum width WMAX of the collision portion 30 is constituted to be approximately 2 mm. By setting a long length L in this way, the vortex formed by collision portion 30 grows sufficiently by the time it reaches connecting portion J of vortex street conduit 26, making the vortex less susceptible to effects from connecting portion J. The length L from the upstream end of collision portion 30 to the downstream end of vortex street conduit 26 formed in upstream member 18 is constituted to be 2.5 or greater times the maximum width WMAX of collision portion 30.

Figure 7:
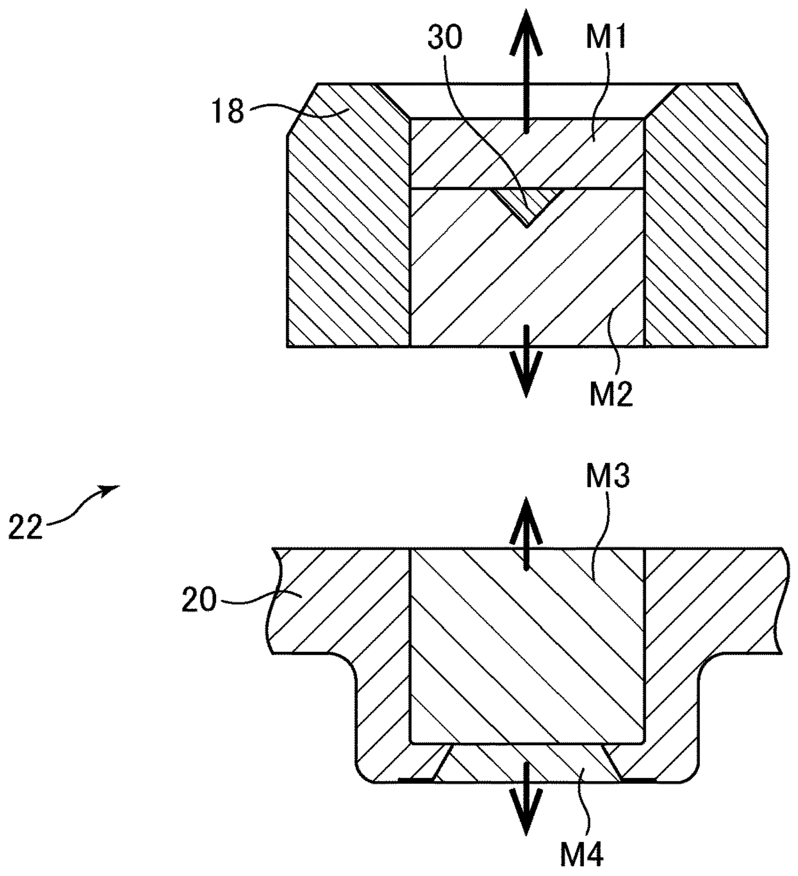
FIG. 7: A diagram schematically showing an oscillation generating element according to a first embodiment of the invention.
Figure 8:
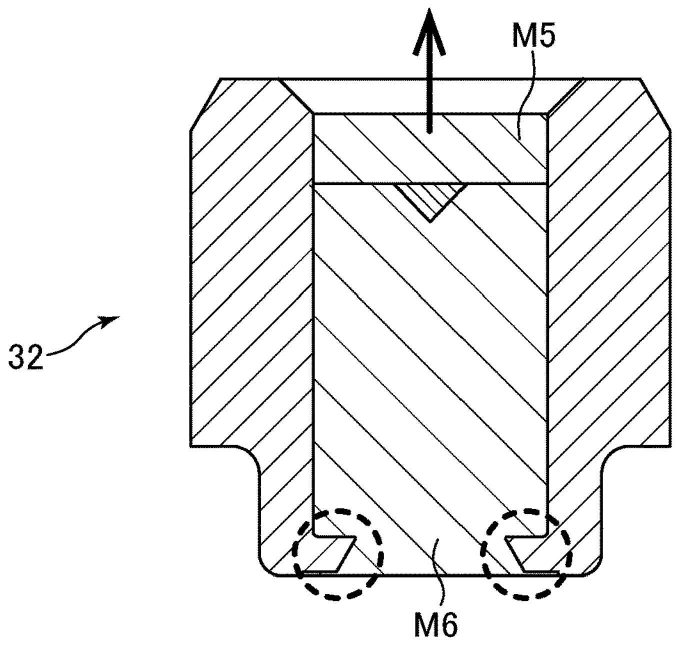
FIG. 8: A diagram schematically showing an integrally constituted oscillation generating element as a comparative example.

Next, referring to FIGS. 7 through 10, we explain the advantages of constituting oscillation generating element 22 from two members, and the step difference created at the connecting portion between the two members. FIG. 7 is a diagram schematically showing an oscillation generating element in the present embodiment constituted by two members; FIG. 8 is a comparative example schematically showing an oscillation generating element constituted as a single piece.

As shown in FIG. 7, oscillation generating element 22 of the present embodiment is constituted by an upstream member 18 and a downstream member 20, and vortex street conduit 26 is constituted by two members. Therefore, when molding an upstream member 18 by injection molding, molding dies M1 and M2 can be respectively extracted from the upstream side and downstream side by dividing molding dies M1 and M2 at collision portion 30. Similarly, when molding a downstream member 20, dividing molding dies M3 and M4 at the boundary between vortex street conduit 26 and discharge conduit 28 enables molding dies M3 and M4 to be respectively extracted from the upstream side and the downstream side. Therefore, upstream member 18 and downstream member 20 can be easily molded by injection molding or the like.

On the other hand, as shown in FIG. 8, in the single piece molded oscillation generating element 32 of the comparative example, molding die M5 can be pulled out from the upstream side when performing injection molding, but in the molding die M6, the part surrounded by the dotted line in the figure catches. Therefore, molding die M6 cannot be easily pulled out from the downstream side, and enabling this requires measures such as selecting an elastically deformable material for injection molding use. Hence when molding an oscillation generating element as a single piece, certain restrictions are imposed on the selection of materials and the like, and there is great merit in adopting a divided structure for oscillation generating element 22, as in the present embodiment.

Figure 9:
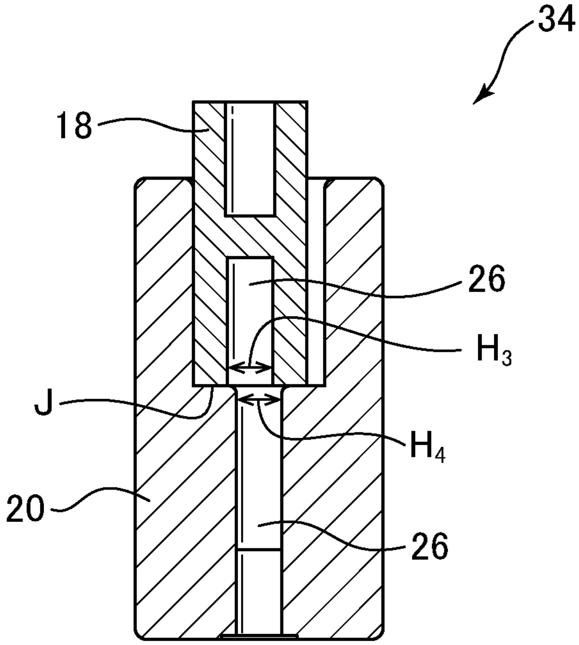
FIG. 9: A cross-sectional view showing a comparative example of an oscillation generating element with a divided structure.
Figure 10:
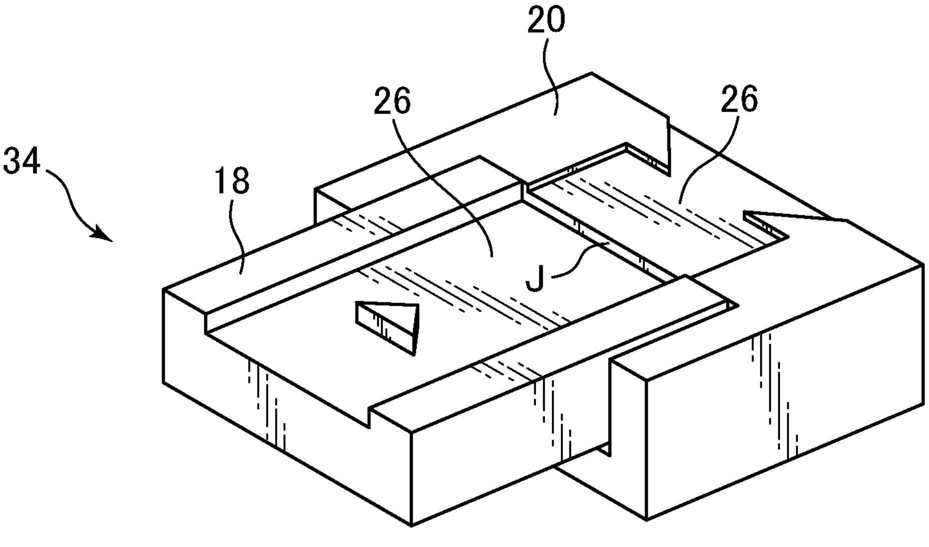
FIG. 10: A perspective cross-sectional view showing a comparative example of an oscillation generating element with a divided structure.
Figure 11:
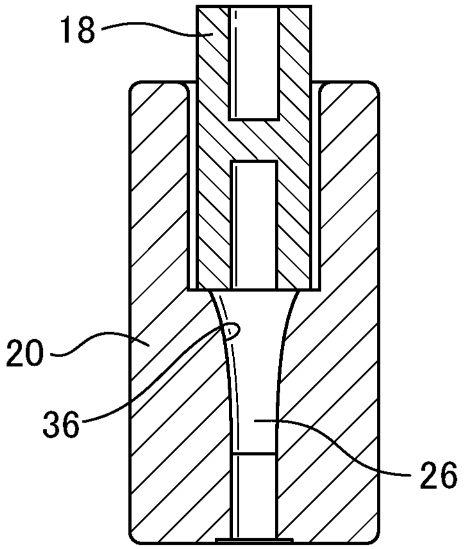
FIG. 11: A cross-sectional view showing a variant example of the first embodiment of the invention.

However, using a divided structure for the oscillation generating element and constituting the vortex street conduit 26 of two members produces other problems. FIG. 9 is a cross-sectional view showing a comparative example of an oscillation generating element with a divided structure; FIG. 10 is a perspective sectional view of the oscillation generating element according to this comparative example.

As shown in FIG. 9, oscillation generating element 34 according to the comparative example is constituted by upstream member 18 and downstream member 20, but the height H4 at the upstream end of vortex street conduit 26 formed in downstream member 20 and the height H3 at the downstream end of vortex street conduit 26 formed in upstream member 18 are constituted to be the same. Here it is impossible to mold upstream member 18 and downstream member 20 with perfect dimensional and shape accuracy, and the type of offset shown in FIG. 9 is produced in the connecting portion J between upstream member 18 and downstream member 20. Thus, when an offset occurs in the assembly of the upstream member 18 and downstream member 20, a step difference is created at the connecting portion J between the assembled upstream member 18 and the downstream member 20, as shown in FIG. 10.

In FIG. 10, at the connecting portion J between upstream member 18 and downstream member 20, a step difference is formed on the inner wall surface of vortex street conduit 26, narrowing the flow path in the height direction toward the downstream side (on the inner wall surface on the opposite side, a step difference is formed which widens the flow path in the height direction toward the downstream side). The present inventors discovered that when a step difference of this type, which narrows the flow path in the height direction, is formed on the inner wall surface of vortex street conduit 26, vortices guided by vortex street conduit 26 are weakened, and problems arise such as water spouted from discharge conduit 28 ceasing to oscillate or diminishing oscillation amplitude.

By contrast, in the oscillation generating element 22 of the present embodiment, as shown in FIG. 6, the height H2 at the upstream end of vortex street conduit 26 formed in downstream member 20 is constituted to be higher than the height H1 at the downstream end of vortex street conduit 26 formed in upstream member 18. Therefore, even if a misalignment occurs in the assembly of upstream member 18 and downstream member 20, the step difference produced at the connecting portion J of these members will on both sides be a step difference that widens the flow path in the height direction toward the downstream side. Step differences that widen the flow path toward the downstream side have little effect on vortices flowing inside vortex street conduit 26, and even if there are step differences, it will not occur that discharged water ceases to oscillate, or that the amplitude of oscillating vibration is significantly reduced.

In the present embodiment the height H2 at the upstream end of vortex street conduit 26 formed in downstream member 20 is approximately 1.6 mm, and the height at the downstream end of vortex street conduit 26 formed in upstream member 18 is approximately 1.0 mm. Therefore, height H2 is constituted to be approximately 0.6 mm higher than height H1. As a result, even if there are variances in the dimensions or shape of the upstream member 18 or downstream member 20 themselves, or variances in assembling these members, this will not produce step differences which narrow the flow path in the height direction toward the downstream side at the connecting portion J. The difference between heights H1 and H2 should be set so that no step difference is produced in a direction which narrows the flow path toward the downstream side, even if the maximum assumed dimensional variance in upstream member 18 and downstream member 20 and the maximum assumed variance in assembling these members occur.

Also, in the present embodiment the width W2 at the upstream end of vortex street conduit 26 formed in downstream member 20 is approximately 5.7 mm, and the width W1 at the downstream end of vortex street conduit 26 formed in the upstream member 18 is approximately 6.1 mm. Therefore, in the width direction of vortex street conduit 26 as well, width W2 is constituted to be approximately 0.4 mm wider than width W1. Even if the width of vortex street conduit 26 is larger than the height, producing a step difference of the same size, the influence on vortices flowing within will be small. However, it is preferable in the width direction as well to form width W2 to be wider than width W1 so that a step difference which narrows the flow path in the width direction does not occur toward the downstream side.

Next, referring to FIGS. 11 through 16, we explain a variant example of a first embodiment of the invention. In the first embodiment described above, vortex street conduit 26 formed in downstream member 20 is constituted in its entirety to be a tapered portion, so that the height of the conduit decreases toward the downstream, as shown in FIG. 6. In contrast, as shown in the FIG. 11 variant example, the vortex street conduit 26 formed in downstream member 20 may be constituted so that the height at the curved surface 36 decreases toward the downstream.

Figure 12:
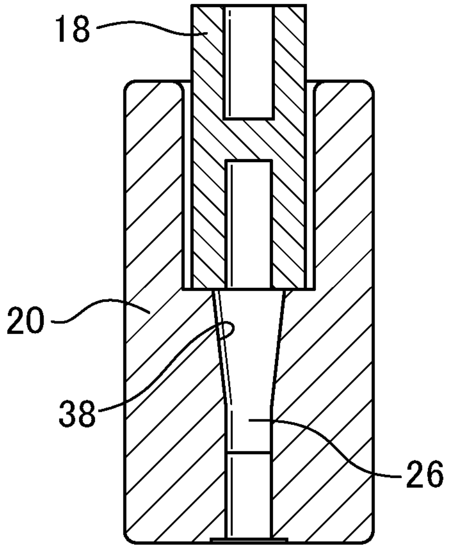
FIG. 12: A cross-sectional view showing a variant example of the first embodiment of the invention.
Figure 13:
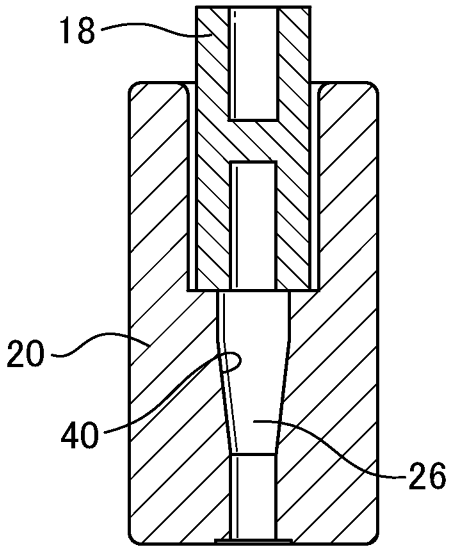
FIG. 13: A cross-sectional view showing a variant example of the first embodiment of the invention.

Also, in the variant example shown in FIG. 12, only the base end portion of vortex street conduit 26 formed in downstream member 20 is constituted as a tapered portion 38, and the downstream side flow path in tapered portion 38 is constant in height. Alternatively, as in the variant example shown in FIG. 13, it is also possible to constitute only the leading end portion of vortex street conduit 26 formed in downstream member 20 as the tapered portion 40, constituting the base end portion flow path to have a constant height.

Figure 14:
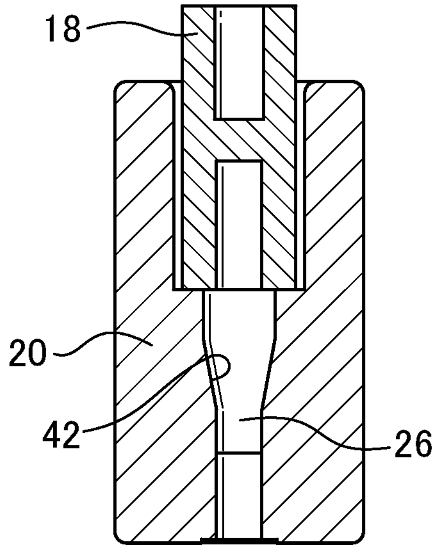
FIG. 14: A cross-sectional view showing a variant example of the first embodiment of the invention.
Figure 15:
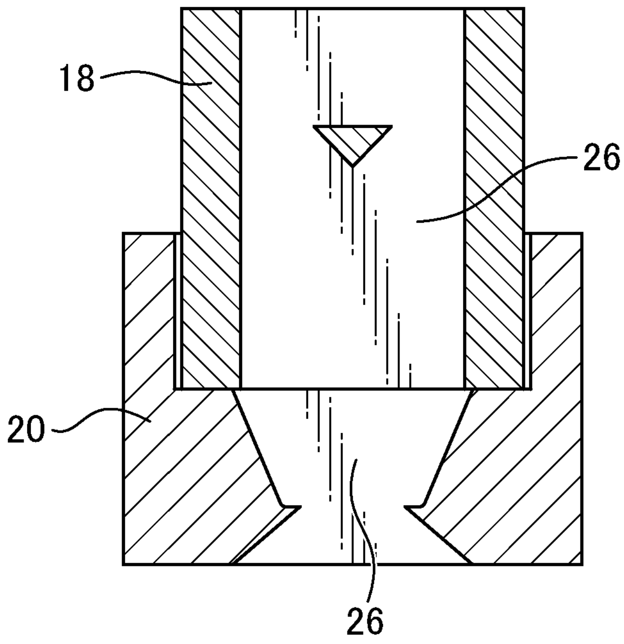
FIG. 15: A cross-sectional view showing a variant example of the first embodiment of the invention.

In addition, as in the variant example shown in FIG. 14, it is possible to constitute only the intermediate portion of vortex street conduit 26 formed in downstream member 20 as tapered portion 42, constituting the base end portion and the leading end portion flow path to have a constant height. As described above, it is preferable that the height of vortex street conduit 26 formed in downstream member 20 be constituted either to smoothly decrease monotonically toward the downstream, or to be constant.

Also, in the first embodiment described above, the width of vortex street conduit 26 formed in downstream member 20 was slightly wider than the width of vortex street conduit 26 formed in upstream member 18, as shown in FIG. 5, and the width was constant over the entirety. By contrast, as in the variant example shown in FIG. 15, a constitution may be adopted in which the width of vortex street conduit 26 formed in downstream member 20 is wider at the upstream end thereof than the width of the vortex street conduit formed in upstream member 18, and the width narrows toward the downstream side.

Figure 16:
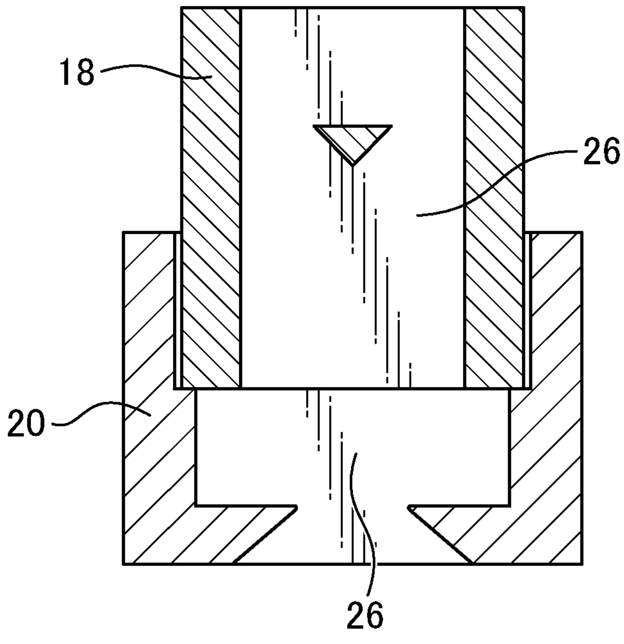
FIG. 16: A cross-sectional view showing a variant example of the first embodiment of the invention.

Alternatively, as shown in the variant example of FIG. 16, a constitution is also possible in which the width of vortex street conduit 26 formed in downstream member 20 is wider by a predetermined width than the width of vortex street conduit 26 formed in upstream member 18.

In the water spouting apparatus 1 of the first embodiment of the invention, vortex street conduit 26 is formed by connecting upstream member 18 and downstream member 20, therefore upstream member 18 and downstream member 20 can be constituted in a shape which is easily removable from the mold when molding resin (FIG. 7). The selectable range of usable molding resins can thus be expanded.

Also, in the water spouting apparatus 1 of the present embodiment the height H2 of vortex street conduit 26 at the upstream end of downstream member 20 is constituted to be higher than the height H1 of vortex street conduit 26 at the downstream end of upstream member 18. Therefore, even if there are dimensional variances and shape variances in the upstream member 18 and downstream member 20, formation of step differences that narrow the flow path in the height direction at the connecting portion J of these members can be easily prevented, and significant degradation in the performance of the oscillation generating element 22 can be avoided, while easily molding the upstream member 18 and downstream member 20.

In addition, in the water spouting apparatus 1 of the present embodiment, vortex street conduit 26 formed in downstream member 20 is constituted so that its height is smoothly diminished toward the downstream (FIG. 6 and FIGS. 11 through 14), therefore the flow velocity of water flowing into downstream member 20 gradually increases toward the downstream. As a result, the flow velocity of water flowing in vortex street conduit 26 can be made to approach the flow velocity when water flows out from upstream member 18, and the negative effects of dividing the vortex street conduit 26 into two members can be ameliorated. Also, since vortex street conduit 26 in downstream member 20 is constituted so that its height diminishes smoothly without a step difference, it is less susceptible to the effects of vortices included in water flowing in the conduit, and water can be discharged at the desired oscillation angle and showering comfort.

Also, by using the water spouting apparatus 1 of the present embodiment, the height of vortex street conduit 26 is reduced toward the downstream by providing a tapered portion in vortex street conduit 26 (FIG. 6, FIGS. 12 through 14), therefore the height of the vortex street conduit can be gradually reduced using a simple shape.

In addition, by using the water spouting apparatus 1 of the present embodiment the height at the downstream end of vortex street conduit 26 in downstream member 20 is the same as the height H1 at the downstream end of vortex street conduit 26 in upstream member 18, therefore the flow velocity of water, reduced at the connecting portion J between upstream member 18 and downstream member 20, can be returned to the flow velocity at the downstream end of vortex street conduit 26 in upstream member 18. As a result, the effect of constituting vortex street conduit 26 of two members can be still further reduced.

Also, using to the water spouting apparatus 1 of the present embodiment, the length L (FIG. 5) from the upstream end of collision portion 30 to the downstream end of vortex street conduit 26 formed in upstream member 18 is constituted to be sufficiently longer than the collision portion 30 maximum width WMAX. For this reason, generated vortices pass through the connecting portion J between upstream member 18 and downstream member 20 after sufficiently growing within vortex street conduit 26, and the negative effects of a flow which includes vortices passing through connecting portion J can be ameliorated.

Also, using the water spouting apparatus 1 of the present embodiment, at the connecting portion J between upstream member 18 and downstream member 20 the width W2 of the vortex street conduit at the upstream end of downstream member 20 is constituted to be wider than the vortex street conduit width W1 at the downstream end of upstream member 18 (FIG. 5). As a result, the formation of step differences that narrow the vortex street conduit 26 in the width direction toward the downstream side, and the negative effects of forming the vortex street conduit 26 by dividing it into an upstream member 18 and a downstream member 20, can be still further ameliorated.

Also, in the water spouting apparatus 1 of the present embodiment, deformation of vortex street conduit 26 by water pressure can be suppressed in the upstream part where water pressure is relatively high by forming the upstream member 18 with a hard member. Also, by forming downstream member 20 with a soft member, the discharge conduit 28 part can be elastically deformed, and the calcium component (scale) can be easily removed even if the calcium component contained in tap water is deposited and solidified inside downstream end discharge conduit 28.

Next, referring to FIGS. 17 through 21, we explain a shower head, which is a water spouting apparatus according to a second embodiment of the invention. The water spouting apparatus of the present embodiment differs from the above-described first embodiment in that the water spouting apparatus body is constituted as a cylindrical shape, and the built-in oscillation generating element comprises a bypass conduit. Therefore, in the following only the points different from the first embodiment of the present embodiment will be described, and a description of those parts with the same configuration, operation, and effect will be omitted.

Figure 17:
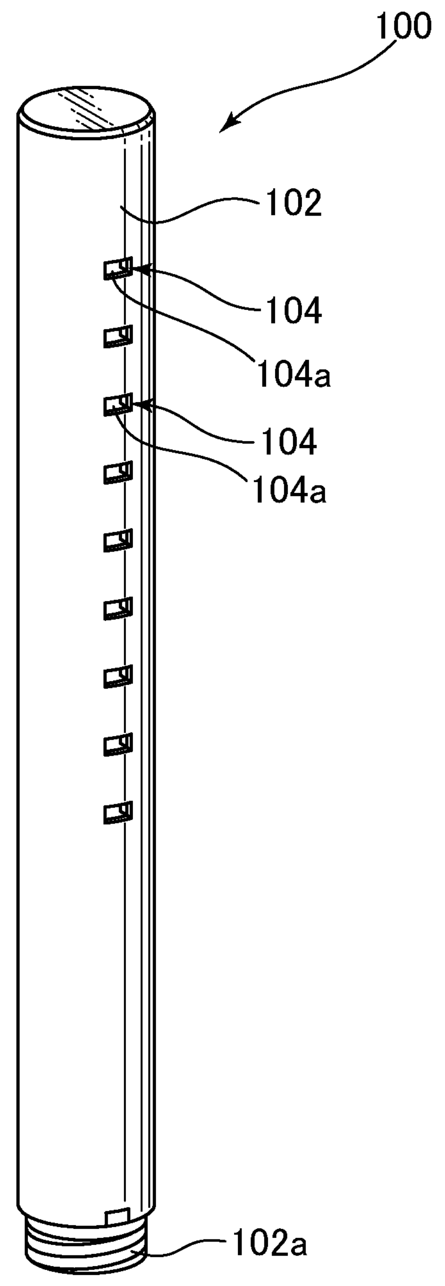
FIG. 17: A perspective view showing the external appearance of a shower head according to a second embodiment of the invention.
Figure 18:
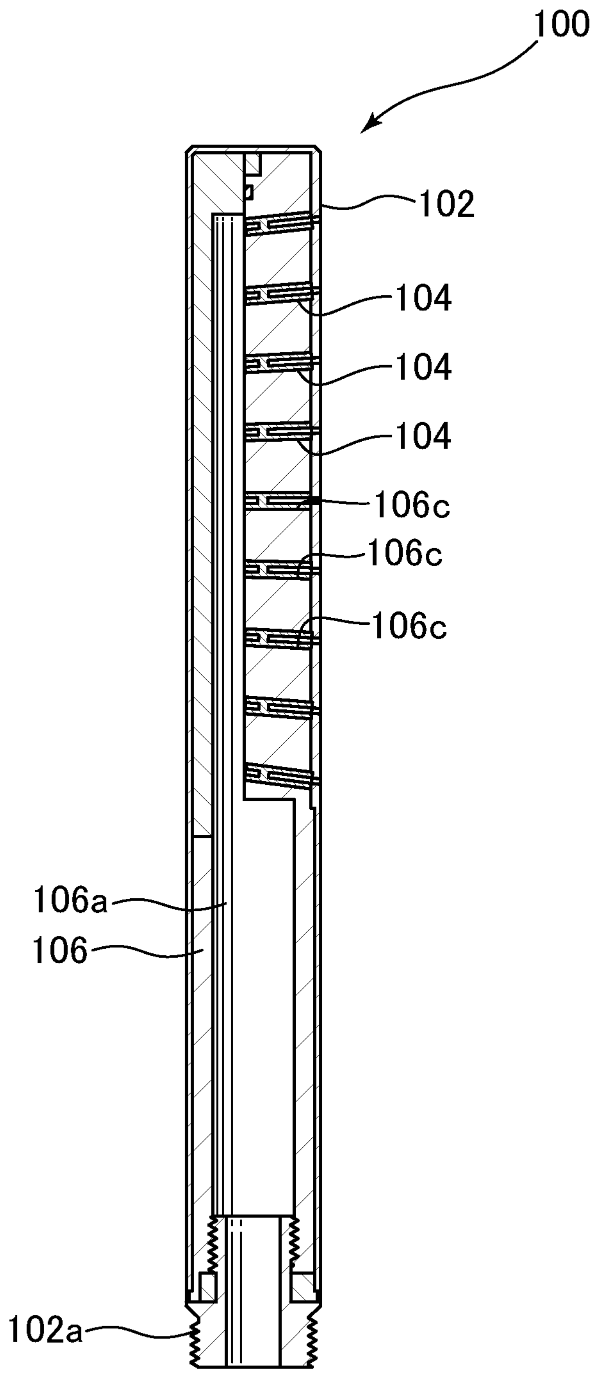
FIG. 18: A complete cross-sectional view of a shower head according to a second embodiment of the invention.
Figure 19:
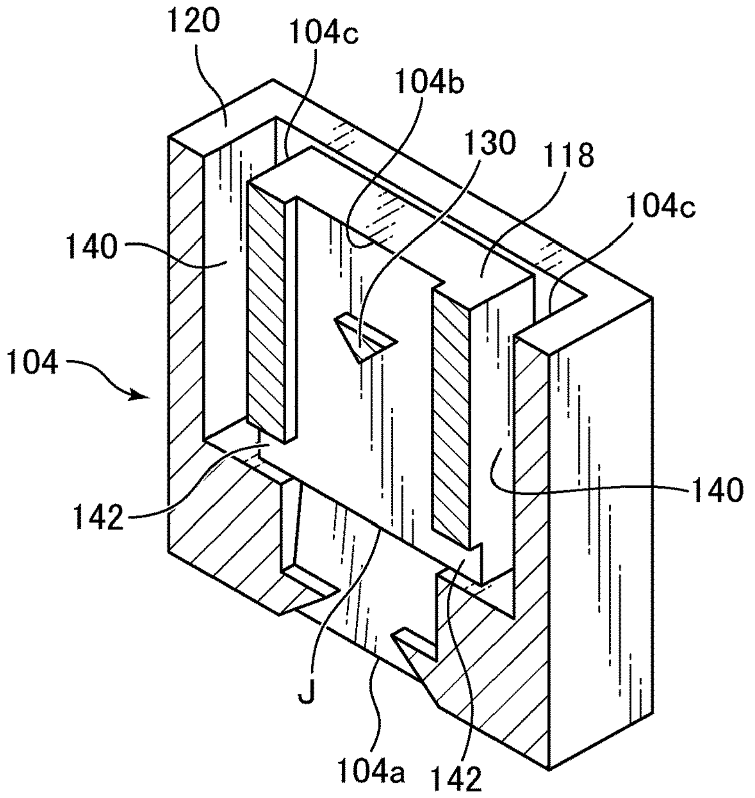
FIG. 19: A perspective sectional view of an oscillation generating element provided in a shower head according to a second embodiment of the invention.
Figure 20:
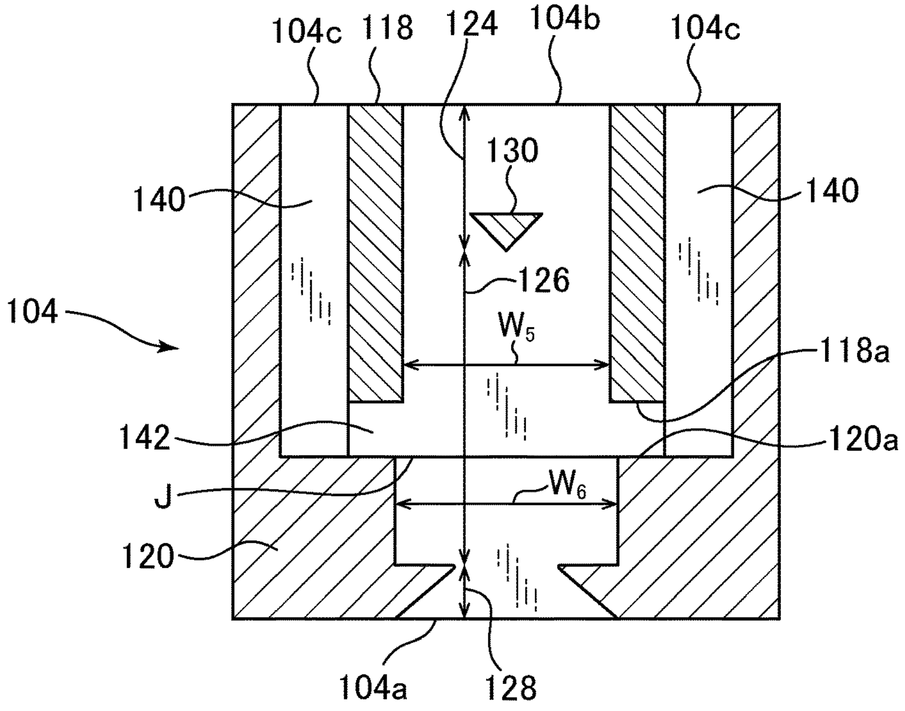
FIG. 20: A cross-sectional view of an oscillation generating element provided in a shower head according to a second embodiment of the invention cut in a direction parallel to an oscillation plane.
Figure 21:
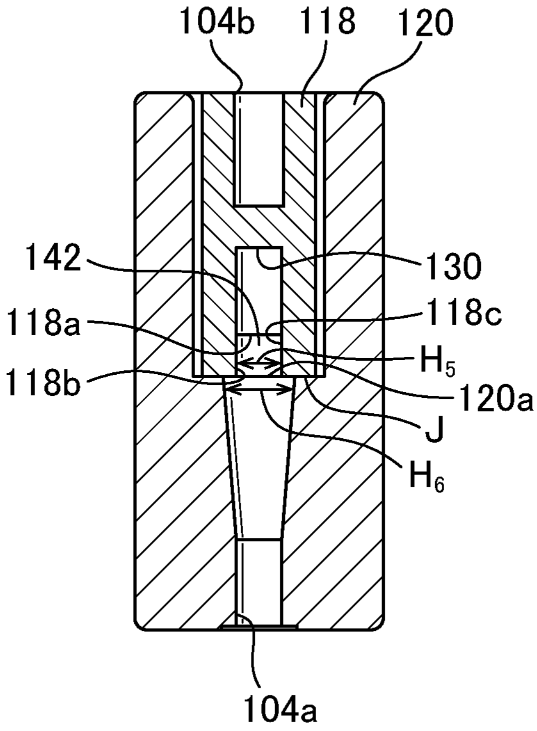
FIG. 21: A cross-sectional view of an oscillation generating element provided in a shower head according to a second embodiment of the invention cut in a direction perpendicular to an oscillation plane.

FIG. 17 is a perspective view showing the external appearance of a shower head according to a second embodiment of the invention. FIG. 18 is a full cross-sectional view of a shower head according to a second embodiment of the invention. FIG. 19 is a perspective cross-sectional view of an oscillation generating element provided in a shower head according to a second embodiment of the invention. FIG. 20 is a cross-sectional view of an oscillation generating element, cut in a direction parallel to the oscillation plane; FIG. 21 is a cross-sectional view of an oscillation generating element cut in a direction perpendicular to the oscillation plane.

As shown in FIG. 17, shower head 100 of the present embodiment has a shower head main body 102, which is a substantially cylindrical water spouting apparatus body, and nine oscillation generating elements 104 embedded in a straight line in the axial direction inside shower head main body 102. Shower head 100 of the present embodiment operates such that when water is supplied from a shower hose (not shown) connected to the base end portion 102*a* of shower head main body 102, water is discharged as it is oscillated from the spouts 104*a* on each oscillation generating element 104.

Next, referring to FIG. 18, we explain the internal structure of shower head 100. As shown in FIG. 18, a water conduit-forming member 106 for forming a water conduit and holding each oscillation generating element 104 is built into shower head main body 102. Water conduit-forming member 106 is an approximately cylindrical member and is constituted to form a flow path of water supplied to the interior of shower head main body 102. A shower hose (not shown) is connected in a water-tight manner to the base end of water conduit-forming member 106. Also, a main water conduit 106*a* extending in approximately the axial direction is formed inside water conduit-forming member 106.

In addition, nine element insertion holes 106*c* for inserting and holding each oscillation generating element 104 are formed in water conduit-forming member 106 to communicate with main water conduit 106*a*. Each element insertion hole 106*c* is formed to extend from the outer peripheral surface of water conduit-forming member 106 to main water conduit 106*a*. Also, element insertion holes 106*c* are formed to align in a straight line in the axial direction at substantially equal intervals. This means that water which has flowed into main water conduit 106*a* in water conduit-forming member 106 flows into each oscillation generating element 104 held by water conduit-forming member 106 from the back surface side thereof and is discharged from the water discharge port 104*a* disposed on the front surface thereof.

Next, referring to FIGS. 19 through 21, we explain the constitution of oscillation generating element 104, built into the shower head of the present embodiment. As shown in FIGS. 19 through 21, oscillation generating element 104 is a substantially thin rectangular parallelepiped member, with a rectangular water discharge port 104*a* disposed on the end surface on the front side thereof, and a main inflow port 104*b* disposed at the center of the end surface on the back side thereof, with bypass inflow ports 104*c* disposed on both sides thereof. When each oscillation generating element 104 is inserted into an element insertion hole 106*c*, main inflow port 104*b* and bypass inflow ports 104*c* communicate with water conduit-forming member 106 main water conduit 106*a*.

Also, oscillation generating element 104 is constituted of two members: an upstream member 118 and a downstream member 120, and upstream member 118 is inserted into the downstream member 120 from the back surface side. With this configuration, second water supply conduits 140 are respectively formed between both side surfaces of upstream member 118 and the inner wall surfaces of downstream member 120.

Furthermore, as shown in FIG. 20, water supply conduit 124, vortex row conduit 126, and discharge conduit 128 are formed in that order from the upstream side within oscillation generating element 104. Also, a collision portion 130 is disposed at the downstream end portion of water supply conduit 124. Here the water supply conduit 124 and the upstream side of vortex street conduit 126 are formed inside upstream member 118, and the downstream side of vortex street conduit 126 and discharge conduit 128 are formed inside the downstream member 120.

Water supply conduit 124 is a linear conduit having a fixed cross sectional surface area and a rectangular cross section, extending from the main inflow port 104*b* on the back side of oscillation generating element 104.

Vortex street conduit 126 is a conduit with a rectangular cross section disposed downstream of water supply conduit 124 and continuing water supply conduit 124. I.e., in the present embodiment the upstream side of water supply conduit 124 disposed on the inside of upstream member 118 and vortex street conduit 126 extend in a straight line with the same cross-sectional shape. Also, the downstream side of vortex street conduit 126 is disposed inside downstream member 120.

Here, as shown in FIG. 21, the height H6 at the upstream end of vortex street conduit 126 formed in downstream member 120 is constituted to be higher than the height H5 at the downstream end of vortex street conduit 126 formed in upstream member 118. This prevents the formation of a step difference on the inner wall surface of vortex street conduit 126, narrowing the flow path in the height direction toward the downstream side at connecting portion J between upstream member 118 and downstream member 120. In addition, vortex street conduit 126 formed in downstream member 120 is constituted to be tapered so that its height decreases toward the downstream end. Also, as shown in FIG. 20, the width W6 of vortex street conduit 126 at the upstream end of downstream member 120 is wider than the width W5 of vortex street conduit 126 at the downstream end of upstream member 118.

Discharge conduit 128 is a conduit disposed on the downstream side to communicate with vortex street conduit 126 and is constituted so that its width expands toward the downstream direction. Also, the height of discharge conduit 128 is constant. The flow path cross-sectional area at the upstream end of discharge conduit 128 is smaller than the flow path cross-sectional area of vortex street conduit 126, and the water flow including the vortex street guided by vortex street conduit 126 is narrowed and discharged from spout port 104*a*.

In addition, rectangular cross section bypass conduits 142 are respectively disposed on the side surfaces on both sides of vortex street conduit 126 to face one another. Water that has respectively flowed in from each of the second water supply conduits 140 passes through each bypass conduit 142 and flows into vortex street conduit 126 from the side surface of vortex street conduit 126, downstream of collision portion 130. Each bypass conduit 142 is disposed at connecting portion J between upstream member 118 and downstream member 120. Therefore, a portion of the inner wall surface constituting bypass conduit 142 is disposed in downstream member 120, and the remaining part is disposed on upstream member 118.

In the present embodiment, as shown in FIGS. 20 and 21, only the inner wall surface 120*a* positioned on the furthest downstream side, which constitutes bypass conduit 142, is disposed on downstream member 120, and the remaining inner wall surface 118*a* and inner wall surface 118*b*, 118*c* are disposed on upstream member 118. Thus, in the present embodiment a bypass conduit 142 is disposed at the connecting portion J between upstream member 118 and downstream member 120. It is therefore unnecessary to constitute a molding die (not shown) for forming bypass conduit 142 so that it can be extracted in the bypass conduit 142 direction (side), and an oscillation generating element 104 with a bypass conduit 142 can be easily molded.

As a variant example, the present invention may also be constituted so that only the inner wall surface 118*a* positioned on the furthest upstream side is formed in the upstream member 118, and other inner wall surfaces 118*b*, 118*c*, and 120*a* are formed in downstream member 120. It is also possible to constitute the present invention so that inner wall surface 118*a* is formed in upstream member 118, inner wall surface 120*a* is formed in downstream member 120, and inner wall surfaces 118*b* and 118*c* are formed by upstream member 118 and downstream member 120.

At the same time, collision portion 130 formed at the downstream end of water supply conduit 124 is disposed to block a portion of the water supply conduit 124 flow path cross section. Collision portion 130 is a triangular columnar part extending to connect wall surfaces (ceiling surface and floor surface) facing one another in the height direction of water supply conduit 124 and is disposed as an island shape at the center of the width direction of water supply conduit 124. The cross section of collision portion 130 is formed in the shape of an isosceles right triangle; its hypotenuse is disposed to be orthogonal to the center axis of water supply conduit 124, and the right-angled part of the isosceles right triangle faces the downstream side.

By providing a collision portion 130, a Karman vortex is produced on the downstream side thereof, and the water discharged from spout port 104*a* is oscillated. Also, as described above, bypass conduits 142 are disposed on both side surfaces of vortex street conduit 126 to face one another, and water flowing through bypass conduit 142 flows in from second water supply conduit 140. Therefore, bypass conduit 142 allows inflow of water in a direction orthogonal to the direction in which vortex street conduit 126 extends.

From the side surfaces, hot water from each bypass conduit 142 joins the flow which includes the Karman vortices formed by collision portion 130. I.e., water flowing in through bypass conduit 142 bypasses collision portion 130 and flows into vortex street conduit 126.

Because water from each bypass conduit 142 thus joins the flow which includes the Karman vortices formed by collision portion 130 in the vortex street conduit 126, changes in flow velocity at spout 104*a* associated with the advance of the vortex street are diminished. Deflection of discharged water is thus diminished, and the oscillation amplitude of ejected water decreases. I.e., the oscillation amplitude of water can be freely designed by appropriately setting the ratio of the flow volume of water flowing into vortex street conduit 126 through collision portion 130 to the flow volume of water flowing from bypass conduit 142.

In the water spouting apparatus of a second embodiment of the invention, oscillation generating element 104 comprises a bypass conduit 142 (FIG. 20), therefore the amplitude, etc. of the oscillating vibration of water discharged from oscillation generating element 104 can be adjusted using the flow volume of water flowing in from bypass conduit 142. Further, since a portion of the inner wall surface of bypass conduit 142 is formed by downstream member 120, an oscillation generating element 104 comprising a bypass conduit 142 can also be easily formed.

Also, using the water spouting apparatus of the present embodiment, in bypass conduit 142 only the inner wall surface 120*a* (FIG. 20) positioned at the furthest downstream side thereof is formed by downstream member 120, therefore the part where the flow path cross-sectional surface area of vortex street conduit 126 changes as a result of connecting bypass conduit 142 and the part where the flow path cross-sectional surface area of vortex street conduit 126 changes as a result of connecting upstream member 118 and downstream member 120 can be consolidated, and negative effects produced by changes in flow path cross sectional surface area can be ameliorated. By forming only the inner wall surface 120*a* positioned on the furthest downstream side of bypass conduit 142 using the downstream member 120, the part where the flow path cross-sectional area changes as a result of connecting upstream member 118 and downstream member 120 can be separated from collision portion 130, and vortices formed by the collision portion can be sufficiently grown.

We have described preferred embodiments of the invention above, however various modifications can be made to the above-described embodiments. In particular in the above-described embodiments, the present invention was applied to a shower head, but the present invention may be applied to desired water spouting apparatuses such as a faucet device used in a kitchen sink or a wash basin, or a warm water washing device provided in a toilet seat, or the like. In the above-described embodiment, the shower head comprised multiple oscillation generating elements, but the water spouting apparatus can comprise any desired number of oscillations generating elements according to application, and a water spouting apparatus comprising a single oscillation generating element may also be constituted.

Also, in the above-described embodiment of the invention, for convenience we have explained the shape of the conduit in the oscillation generating element using terms such as "width" and "height," but these terms do not define the direction in which the oscillation generating element is disposed; the oscillation generating element may be used in any desired orientation. For example, for the "height" direction in the above-described embodiment, the oscillation generating element may be used in a horizontal direction.

EXPLANATION OF REFERENCE NUMERALS

1 water spouting apparatus
10 water spouting apparatus body
10*a* water discharge head
10*b* grip
12 dispersion plate
14 functional member
16 spray nozzle
18 Upstream member
20 downstream member
20*a* back part
20*b* front part
22 oscillation generating element
24 water supply conduit
26 vortex street conduit
28 discharge conduit
30 collision part
32 oscillation generating element according to the comparative example
34 oscillation generating element according to the comparative example
36 curved surface
38 tapered portion
40 tapered portion
42 tapered portion
100 shower head
102 shower head body
102*a* base end
104 oscillation generating element
104*a* spout
104*b* main inflow port
104*c* bypass inflow port
106 water conduit-forming member
106*a* main water conduit
106*c* element insertion hole
118 upstream member
118*a* inner wall surface
118*b* inner wall surface
118*c* inner wall surface
120 downstream member
120*a* inner wall surface
124 water supply conduit
126 vortex street conduit
128 discharge conduit
130 collision portion
140 second water supply conduit
142 bypass conduit

The invention claimed is:

1. A water spouting apparatus for discharging water with reciprocal motion, comprising:
- a water spouting apparatus body;
- an oscillation generating element disposed on the water spouting apparatus body for spouting water with reciprocal motion within a predetermined oscillation plane;
- whereby the oscillation generating element comprises:
- a water supply conduit into which supplied water flows,
- a collision portion disposed on a downstream end portion of the water supply conduit so as to block a portion of a flow path cross section of the water supply conduit, such that collision of the water guided by the water supply conduit causes vortices in alternating opposing directions to be generated at a downstream side thereof;
- a vortex street conduit disposed downstream of the water supply conduit so as to guide vortices formed by the collision portion, with a width in the direction parallel to the oscillation plane which is wider than its height in the direction perpendicular to the oscillation plane; and
- a water spouting conduit for spouting water guided by the vortex street conduit;
- whereby the vortex street conduit is constituted by connecting an upstream member on which an upstream side of the vortex street conduit is formed and a downstream member on which a downstream side of the vortex street conduit is formed; and
- in a connecting portion between the upstream member and the downstream member, the height of the vortex street conduit at an upstream end of the downstream member is higher than the height of the vortex street conduit at a downstream end of the upstream member, so that no step difference is formed to narrow the flow path in a height direction toward the downstream side on an inner wall surface of the vortex street conduit.

2. The water spouting apparatus according to claim 1, wherein the vortex street conduit formed in the downstream member is constituted so that its height smoothly decreases in the downstream direction.

3. The water spouting apparatus according to claim 2, wherein the vortex street conduit formed in the downstream member has a tapered portion configured to have a lower height toward the downstream.

4. The water spouting apparatus according to claim 2, wherein the height of the downstream end of the vortex street conduit formed in the downstream member is the same as the height of the downstream end of the vortex street conduit formed in the upstream member.

5. The water spouting apparatus according to claim 1, wherein a length from an upstream end of the collision portion to the downstream end of the vortex street conduit formed in the upstream member is 2.5 or greater times a maximum width of the collision portion.

6. The water spouting apparatus according to claim 1, wherein at the connecting portion between the upstream member and the downstream member, the width of the vortex street conduit at the upstream end of the downstream member is wider than the width of the vortex street conduit at the downstream end of the upstream member.

7. The water spouting apparatus according to claim 1, comprising a bypass conduit downstream of the collision portion which causes water to flow into the vortex street conduit, wherein a portion of an inner wall surface of the bypass conduit is formed by the downstream member.

8. The water spouting apparatus according to claim 7, wherein only the inner wall surface positioned on the furthest downstream side of the bypass conduit is formed by the downstream member.

9. The water spouting apparatus according to claim 1, wherein the upstream member is formed of a hard member and the downstream member is formed of a soft member, wherein the hard member is harder than the soft member.

* * * * *